United States Patent [19]
Abraham et al.

[11] Patent Number: 5,842,303
[45] Date of Patent: Dec. 1, 1998

[54] FISHING BAIT DISPENSER

[76] Inventors: George Abraham, 65 Old Kings Rd., Avon, Conn. 06001; Richard L. Pepin, 1006 Mill St., East Berlin, Conn. 06023

[21] Appl. No.: 828,733

[22] Filed: Mar. 21, 1997

[51] Int. Cl.$^6$ ................................................ A01K 97/02
[52] U.S. Cl. ........................................ 43/44.99; 119/51.04
[58] Field of Search ............................. 119/51.04, 57.1, 119/57.92; 43/44.99, 55; 222/345, 346, 368, 369, 371, 415

[56] References Cited

U.S. PATENT DOCUMENTS

| | | |
|---|---|---|
| 695,921 | 3/1902 | Forster . |
| 742,414 | 10/1903 | Hale . |
| 742,415 | 2/1903 | Hale . |
| 848,101 | 3/1907 | Hale . |
| 1,267,730 | 5/1918 | Wolfe . |
| 2,235,922 | 4/1941 | Friesenhahn . |
| 2,243,896 | 3/1941 | Cupples . |
| 2,582,015 | 10/1952 | Duncan, Jr. . |
| 2,833,446 | 5/1958 | Cook et al. . |
| 3,430,753 | 3/1969 | Strang . |
| 3,463,362 | 8/1969 | Garber . |
| 3,727,801 | 4/1973 | Caridis et al. .......................... 222/196 |
| 4,650,264 | 3/1987 | Dahnert .................................. 312/268 |

*Primary Examiner*—Robert P. Swiatek
*Assistant Examiner*—James S. Bergin
*Attorney, Agent, or Firm*—Pepe & Hazard LLP

[57] ABSTRACT

A bait dispenser for a fishing boat has a bin for holding bait with an aperture at its bottom and an opening at its top. Pulleys are provided on the exterior surface of the bin adjacent the bottom aperture and top opening, and a belt extends about the pulleys and passes through the bottom aperture and upwardly through the bin and outwardly of the top opening. A paddle extends perpendicularly to the belt and collects bait on its upper surface as it passes upwardly through the bin. A bottom flap on the bin seals the bottom aperture and is resiliently deflectable for passage of the paddle upwardly into the bin.

18 Claims, 3 Drawing Sheets

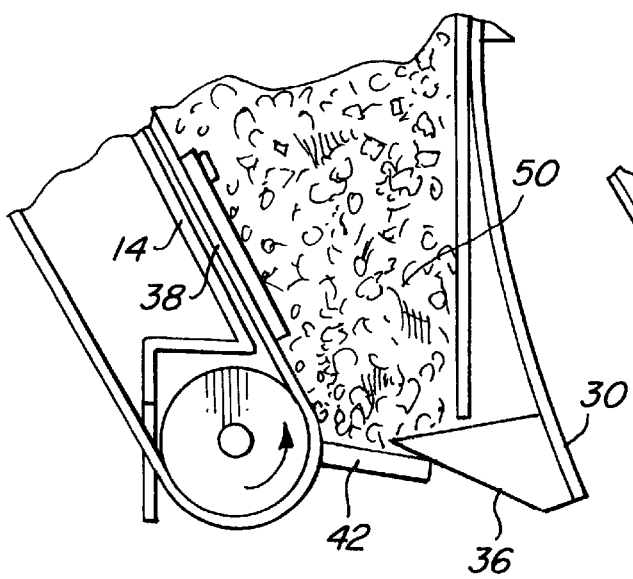
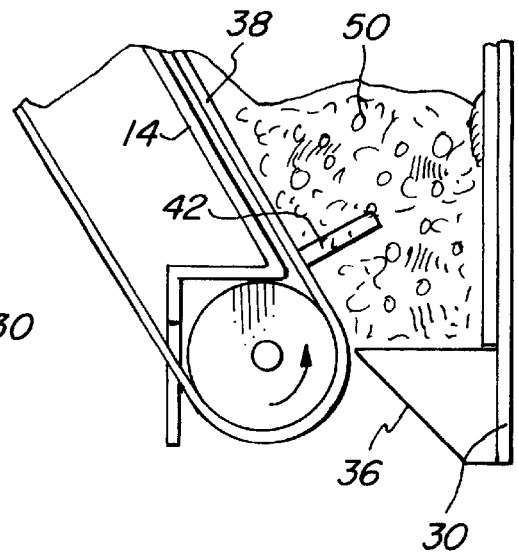
FIG. 3a  FIG. 3b
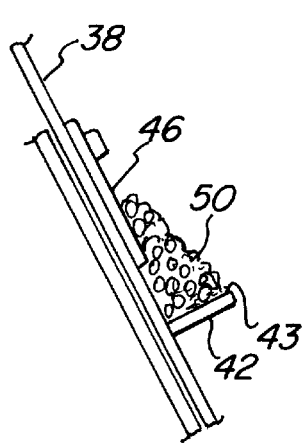
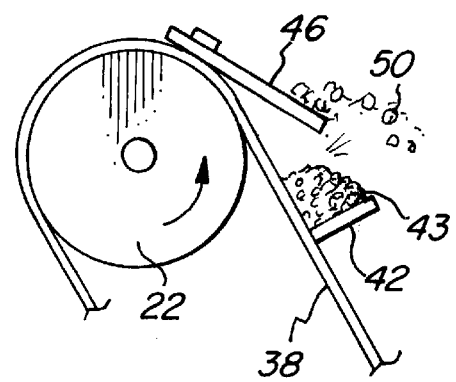
FIG. 4a  FIG. 4b

FISHING BAIT DISPENSER

BACKGROUND OF THE INVENTION

The present invention relates to bait dispensers for fishing, and more particularly to such dispensers for dispensing bait in regulated amounts at designated times without requiring continuous attention from the fisherman.

Deep sea fishing for many kinds of fish, particularly tuna and other game fish, is facilitated by dropping chunks of bait or chum overboard at periodic intervals. This bait creates a line of bait, also known as a chum line, which attracts fish to the fishing boat and the area about it and thereby increases the likelihood of catching fish.

Successful bait distribution is a product of both the amount of bait distributed and the intervals at which it is distributed. Dispensing too much bait will result in the fish feeding away from the fisherman's hook. Dispensing too little bait will result in the fish searching for better feeding opportunities. The optimum interval between dropping of bait is considered to be approximately one minute. While the optimum timing and amounts can vary depending upon conditions, it is imperative that the bait distribution be regulated to maximize the potential for attracting and catching fish.

The traditional method of bait distribution for deep sea fishing is for the fisherman to toss the bait by hand. This method has several disadvantages. The task of bait distribution substantially occupies the fisherman and takes time and attention away from other fishing activity, or it requires the employment of individuals devoted to this task. The bait tossing also tends to create a messy condition for the fisherman as well as for the fishing boat. The task may also be very inefficient in that irregular, non-optimum amounts of bait may be dispensed at irregular and non-optimum intervals. Improved efficiency requires corresponding increases in time, effort, attention and expertise on the part of the fisherman.

Mechanical bait dispensers have been utilized but generally exhibit deficiencies in the ability to efficiently distribute an effective chum line. Exemplary of such a dispenser is that shown in U.S. Pat. No. 695,921, issued to Ferdinand E. Forster on Mar. 25, 1902, titled a "Chum Feeding Machine". This apparatus is designed to be suspended in the water from a boat or buoy and to release bait by the turning of a screw in response to the rising and falling of the waves.

U.S. Pat. No. 2,582,015, issued to Thomas P. Duncan on Jan. 8, 1952, describes a "Fishing Lure For Use in Connection with Haul Seine Systems". This apparatus is a dedicated boat, meant to stand alone in the water for use by seine trawlers around the bait boat and requiring large quantities of bait. The dispensing boat attracts fish to itself, as opposed to the fisherman's boat, by employing light sources and a belt moving over pulleys to continuously dispense large amounts of bait into the water.

Accordingly, it is an object of the present invention to provide a novel bait dispenser for use on a fishing boat which efficiently and automatically drops bait overboard.

It is also an object to provide such a bait dispenser requiring minimal attention from the fisherman, thus leaving the fisherman relatively free from the mess of normal chum tossing.

Still another object is to provide such a bait dispenser which is relatively inexpensive and relatively easily fabricated.

SUMMARY OF THE INVENTION

It has been found that the foregoing and related objects may be readily attained in a bait dispenser for dispensing bait from a boat for fishing which includes a bin for holding bait and having a front wall, a rear wall and two side walls. The bin has an aperture at the bottom thereof and an opening at its top, and a bottom pulley is rotatably mounted on the exterior surface of the bin adjacent the bottom aperture. A top pulley is rotatably mounted on the exterior of the bin adjacent the top opening.

A belt extends about the bottom and top pulleys and passes into the bin through the bottom aperture and upwardly through the bin and outwardly of the top opening, and a paddle on the belt extends perpendicularly thereto for collecting bait on its upper surface as it passes upwardly through the bin. Means for rotating one of the pulleys is provided to move the belt in the direction in which the paddle travels upwardly through the bin from the bottom aperture to the top opening.

A bottom flap on the bin seals the bottom aperture and is resiliently deflectable to enable passage of the paddle upwardly into the bin and to return after passage of the paddle to seal the aperture to prevent bait from falling out. Suitable means is also provided for mounting the bin on a boat.

Desirably, a limiter flap has one end pivotably mounted on the belt adjacent the upper surface of the paddle and normally extend along the surface of the belt towards the paddle, the limiter flap being pivotable upwardly as it passes over the top pulley to return excess bait on the paddle upper surface to the bin.

Generally, the rotating means comprises a variable speed electric motor; and the belt extends along the frontwall. The side walls of the bin are downwardly inwardly inclined to produce a smaller cross section at the bottom of the bin. The paddle is of a length substantially equal to the spacing between the side walls. The rear wall is substantially vertical and the front wall is downwardly inwardly inclined. The flap extends between the front, rear and side walls to seal the aperture, and it is mounted on the rear wall.

Desirably, the flap has a horizontally extending bottom portion and a generally vertically extending mounting portion having its upper end pivotably supported on the rear wall, and the flap is pivotable away from the front wall by the paddle.

In its preferred form, the bottom flap has an upwardly inclined surface adjacent the belt and the paddle abuts the inclined surface as it moves upwardly from the bottom pulley to deflect the flap.

BRIEF DESCRIPTION OF THE DRAWINGS

FIG. 3a is a partially diagrammatic side elevational view of the bin and belt showing the closure flap deflected as the paddle passes thereby;

FIG. 3b is a similar view with the closure flap returned to a sealing position;

FIG. 4a is a partially diagrammatic side view of the limiter flap in its at rest position; and FIG. 4b is a similar view with the limiter flap pivoting to remove excess bait from the paddle.

DETAILED DESCRIPTION OF THE PREFERRED EMBODIMENT

Figure 1:
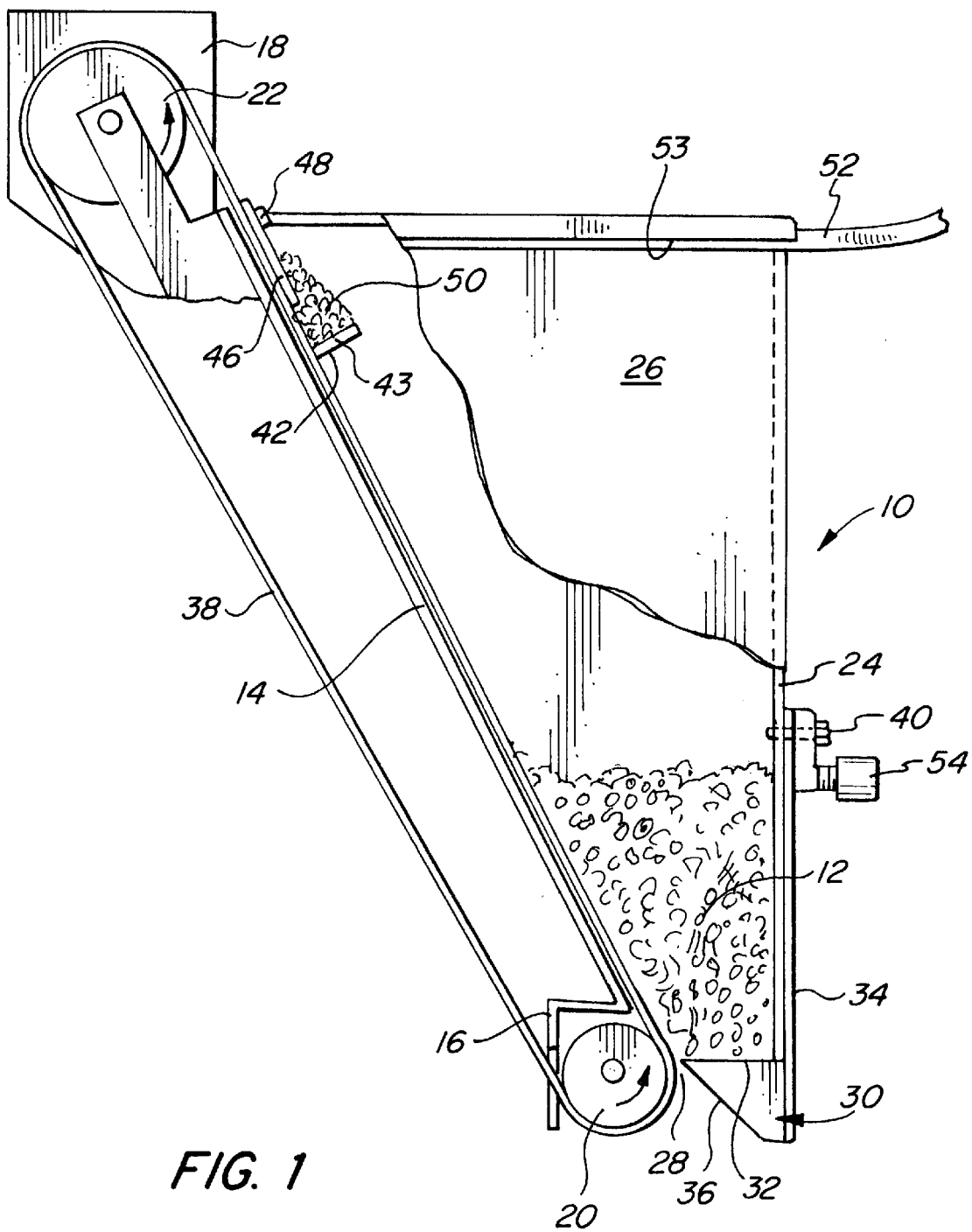
FIG. 1 is a side elevational view of a bait dispenser embodying the present invention with the side wall partially broken away.

Turning first to FIG. 1, therein illustrated is a bin generally designated by the numeral 10 for holding and storing bait 12 such as fish parts. The bin 10 has a downwardly and inwardly inclined front wall 14 and downwardly and forwardly projecting brackets 16 on the sides thereof at its bottom end and brackets 18 projecting forwardly and upwardly at its upper end for rotatably mounting the bottom pulley 20 and top pulley 22, respectively. The bin 10 also has a rear wall 24 for disposition adjacent the side of the boat, and downwardly and inclined side walls 26 to provide a storage area of generally rectangular but downwardly decreasing cross section to facilitate downward movement of the bait.

The bin 10 is open at the top for conveniently loading a bait thereinto and may be closed by a lid or cover (not shown). An aperture 28 is provided at the bottom of the bin 10 and it is closed by a flap generally designated by the numeral 30. The flap 30 has a horizontal portion 32 and a vertical portion 34, and is fabricated from a resiliently deflectable material. The horizontal portion 32 has an end surface 36 which is inclined upwardly towards the front wall 14 and which resiliently bears against the belt 38 extending about the pulleys 20, 22. As seen, the belt 38 extends downwardly along the outer surface of the front wall 14, around the pulley 20, upwardly through the aperture 28, along the inside surface of the front wall 14, and about the pulley 22.

The vertical portion 34 of the flap 30 is secured to the rear wall 24 at its upper end by the threaded fasteners 40 which also extend through the spacer 54, and the resiliently deflectable flap 30 pivots thereabout. A substantially flat rectangular paddle 42 is secured to the belt 38 and projects perpendicularly therefrom.

Figure 2:
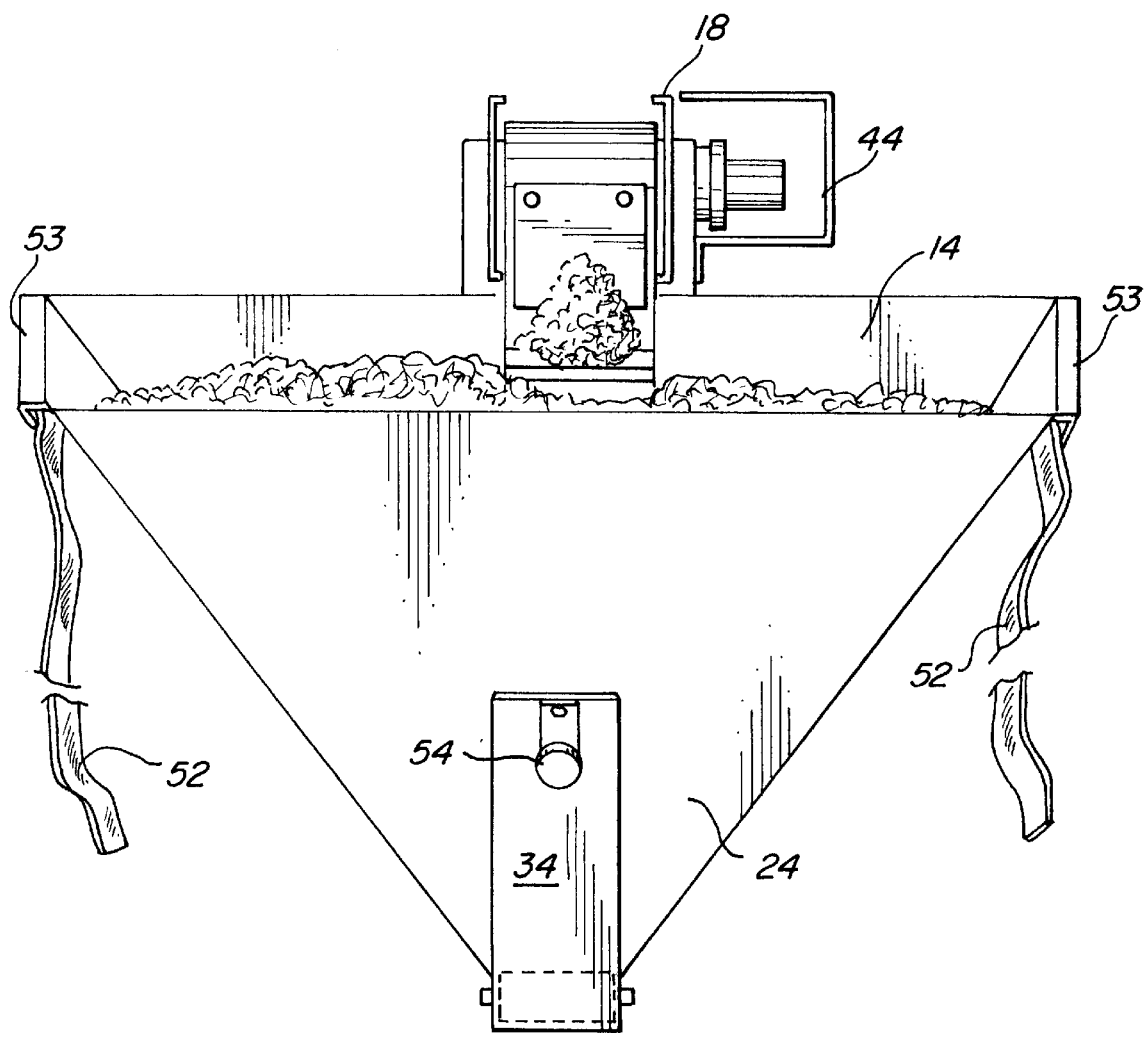
FIG. 2 is a rear perspective view of the bait dispenser with the mounting brackets removed.

As seen in FIG. 2, a battery powered variable speed motor 44 is mounted on the upper end of the front wall 14 on the bracket 18. A waterproof cover may surround the motor 44 to prevent water and spray from contacting the motor so as to maximize the life of the motor 44.

The operation of the dispenser is illustrated in the drawings. As seen in FIG. 3, the paddle 42 abuts the inclined end surface 36 of the flap 30 and pushes the flap 30 away from the front wall 14 until it passes the flap 30. As seen in FIG. 3A, the flap 30 then returns to its aperture closing position seen in FIG. 3B by its inherent resiliency.

As seen in FIG. 4, a flat, rectangular limiter flap 46 is secured to the belt 38 by rivets 48 so that it advances ahead of the paddle 42 as it moves upwardly in the bin 10. It will also effect some deflection of the flap 30 as it moves thereby although it lies essentially flat against the belt 38.

As seen is FIG. 4, the limiter flap 46 operates to limit the amount of bait 50 upon the paddle 42 for distribution in one revolution. The paddle 42 initially collects bait 50 on its upper surface 43 as it moves through the bin 10 and the limiter flap 46 lies flat against the belt 38. As the limiter flap 46 moves over the top pulley 22, the outer end of the limiter flap 46 pivots away from the paddle 42 and pushes excess bait 50 back into the bin 10. As seen in FIG. 4b, the bait 50 remaining on the paddle 42 is then discharged over the side of the vessel into the water as the paddle 42 begins its downward motion after passing over the top pulley 22.

The bin 10 is mounted on the side of the boat (not shown) by a tie line 52 which extends about the under surface of a lip 53 at the top of the bin 10 and is secured to cleats (not shown), and the bin is spaced from the side of the boat in a generally vertical position by the adjustable spacer 54. As will be appreciated, the dispenser is mounted on the side of the boat so that it extends over the water.

The bin may have differing configuration but ideally tapers to a smaller cross section at its lower end to facilitate closure of the bottom aperture by the flap and dispensing of all of the bait placed therein. The bin may be fabricated by molding from synthetic resin, by thermoforming sheet material, or by adhering separate sheets. The bin may also be fabricated from metals, preferably those exhibiting corrosion resistance.

The belt is conventionally fabricated from an elastomeric material to allow tensioning around the pulleys and the elastomer should desirably exhibit good resistance to the oils and other chemicals found in bait. Neoprene and other synthetic elastomers are preferred.

The paddle and limiter flap are conveniently formed from synthetic resin exhibiting good resistance to the oils and chemicals found in the bait. Polypropylene and polyethylene are suitable. The paddle and limiter flap are conveniently secured to the belt by rivets although adhesives and any other suitable means may also be employed.

The bottom flap is conveniently fabricated from a synthetic resin having good chemical resistance and exhibiting the resilient deflectability such as ethylene, propylene ethylene/propylene terpolymers, ABS and nylon. It may also be fabricated of a resiliently deflectable metal such as copper and steel; however, if steel is employed, it should have a protective coating.

Thus, it can be seen from the foregoing description and drawings that the bait dispensing apparatus of the present invention efficiently generates an effective chum line for attracting tuna and other game fish towards a fishing boat. The bin conveniently stores and dispenses an appropriate amount of fish parts or other bait for game fishing, and can be easily restocked. The electric motor provides convenient and reliable operation of the apparatus without significant attention from the fisherman. Remaining bait can be removed by pulling the bottom flap away from the belt and allowing the bait to drop into the water or into a bucket.

Having thus described the invention, what is claimed is:

1. A bait dispenser for dispensing bait from a boat for fishing, comprising:

(a) a bin for holding bait and having a front wall, a rear wall and two side walls, said bin having an aperture at the bottom thereof and an opening at its top;

(b) a bottom pulley;

(c) means rotatably mounting said bottom pulley on the exterior surface of said bin adjacent said bottom aperture;

(d) a top pulley;

(e) means rotatably mounting said top pulley on the exterior of said bin adjacent said top opening;

(f) a belt extending about said bottom and top pulleys and passing into said bin through said bottom aperture and upwardly through said bin and outwardly of said top opening;

(g) a paddle on said belt and extending perpendicularly thereto for collecting bait on its upper surface as it passes upwardly through said bin;

(h) limiter means on said belt for returning to said bin excess bait on said upper surface of said paddle;

(i) means for rotating one of said pulleys to move said belt in the direction in which said paddle travels upwardly through said bin from said bottom aperture to said top opening;

(j) a bottom flap on said bin sealing said bottom aperture and resiliently deflectable for passage of said paddle upwardly into said bin and returning after passage of said paddle to seal said aperture to prevent bait from falling out; and (k) means for mounting said bin on a boat.

2. The bait dispenser in accordance with claim 1 wherein said limiter means comprises a limiter flap having one end pivotably mounted on said belt adjacent said upper surface of said paddle and normally extending along the surface of said belt towards said paddle, said limiter flap being pivotable upwardly as said limiter flap passes over said top pulley to return excess bait on said paddle upper surface to said bin.

3. The bait dispenser in accordance with claim 1 wherein said rotating means comprises a variable speed electric motor.

4. The bait dispenser in accordance with claim 1 wherein said side walls of said bin are downwardly inwardly inclined to produce a smaller cross section at the bottom of said bin.

5. The bait dispenser in accordance with claim 4 wherein said paddle is of a length substantially equal to the spacing between said side walls at the level of said aperture at the bottom of said bin.

6. The bait dispenser in accordance with claim 1 wherein said rear wall is substantially vertical and said front wall is downwardly inwardly inclined.

7. The bait dispenser in accordance with claim 6 wherein said flap extends between said front, rear and side walls to seal said aperture, and wherein said belt extends along said front wall.

8. The bait dispenser in accordance with claim 7 wherein said bottom flap is mounted on said rear wall.

9. The bait dispenser in accordance with claim 7 wherein said flap has a horizontally extending bottom portion and a generally vertically extending mounting portion having its upper end pivotably supported on said rear wall, said flap being pivotable away from said front wall by said paddle.

10. A bait dispenser for dispensing bait from a boat for fishing, comprising:
(a) a bin for holding bait and having a front wall, a rear wall and two side walls, said bin having an aperture at the bottom thereof and an opening at its top, said side walls of said bin being downwardly inwardly inclined to produce a smaller cross section at the bottom of said bin, said rear wall being substantially vertical and said front wall is downwardly inwardly inclined;
(b) a bottom pulley;
(c) means rotatably mounting said bottom pulley on the exterior surface of said bin adjacent said bottom aperture;
(d) a top pulley;
(e) means rotatably mounting said top pulley on the exterior of said bin adjacent said top opening;
(f) a belt extending about said bottom and top pulleys and passing into said bin through said bottom aperture and upwardly along said front wall through said bin and outwardly of said top opening;
(g) a paddle on said belt and extending perpendicularly thereto for collecting bait on its upper surface as it passes upwardly through said bin, said paddle being of a length substantially equal to the spacing between said side walls at the level of said aperture at the bottom of said bin;
(h) limiter means on said belt for returning to said bin excess bait on said upper surface of said paddle;
(i) means for rotating one of said pulleys to move said belt in the direction in which said paddle travels upwardly through said bin from said bottom aperture to said top opening;
(j) a bottom flap on said bin sealing said bottom aperture and resiliently deflectable for passage of said paddle upwardly into said bin and returning after passage of said paddle to seal said aperture to prevent bait from falling out; and
(k) means for mounting said bin on a boat.

11. The bait dispenser in accordance with claim 10 wherein said limiter means comprises a limiter flap having one end pivotably mounted on said belt adjacent said upper surface of said paddle and normally extending along the surface of said belt towards said paddle, said limiter flap being pivotable upwardly as said limiter flap passes over said top pulley to return excess bait on said paddle upper surface to said bin.

12. The bait dispenser in accordance with claim 10 wherein said rotating means comprises a variable speed electric motor.

13. The bait dispenser in accordance with claim 10 wherein said flap extends between said front, rear and side walls to seal said aperture.

14. The bait dispenser in accordance with claim 13 wherein said bottom flap is mounted on said rear wall and said flap has a horizontally extending bottom portion and a generally vertically extending mounting portion having its upper end pivotably supported on said rear wall, said flap being pivotable away from said front wall by said paddle.

15. A bait dispenser for dispensing bait from a boat for fishing, comprising:
(a) a bin for holding bait and having a front wall, a rear wall and two side walls, said bin having an aperture at the bottom thereof and an opening at its top, said rear wall being substantially vertical and said front wall being downwardly inwardly inclined;
(b) a bottom pulley;
(c) means rotatably mounting said bottom pulley on the exterior surface of said bin adjacent said bottom aperture;
(d) a top pulley;
(e) means rotatably mounting said top pulley on the exterior of said bin adjacent said top opening;
(f) a belt extending about said bottom and top pulleys and passing into said bin through said bottom aperture and extending upwardly along said front wall through said bin and outwardly of said top opening;
(g) a paddle on said belt and extending perpendicularly thereto for collecting bait on its upper surface as it passes upwardly through said bin;
(h) means for rotating one of said pulleys to move said belt in the direction in which said paddle travels upwardly through said bin from said bottom aperture to said top opening;
(i) a bottom flap on said bin sealing said bottom aperture and resiliently deflectable for passage of said paddle upwardly into said bin and returning after passage of said paddle to seal said aperture to prevent bait from falling out, said flap extending between said front, rear and side walls to seal said aperture, said flap having a horizontally extending bottom portion and a generally vertically extending mounting portion having its upper end pivotably supported on said rear wall, said flap being pivotable away from said front wall by said paddle; and
(j) means for mounting said bin on a boat.

16. The bait dispenser in accordance with claim 15 wherein said bottom flap has an upwardly inclined surface adjacent said belt and said paddle abuts said inclined surface as it moves upwardly from said bottom pulley to deflect said flap.

17. A bait dispenser for dispensing bait from a boat for fishing, comprising:

(a) a bin for holding bait and having a front wall, a rear wall and two side walls, said bin having an aperture at the bottom thereof and an opening at its top, said side walls of said bin being downwardly inwardly inclined to produce a smaller cross section at the bottom of said bin, said rear wall being substantially vertical and said front wall being downwardly inwardly inclined;

(b) a bottom pulley;

(c) means rotatably mounting said bottom pulley on the exterior surface of said bin adjacent said bottom aperture;

(d) a top pulley;

(e) means rotatably mounting said top pulley on the exterior of said bin adjacent said top opening;

(f) a belt extending about said bottom and top pulleys and passing into said bin through said bottom aperture and upwardly along said front wall through said bin and outwardly of said top opening;

(g) a paddle on said belt and extending perpendicularly thereto for collecting bait on its upper surface as it passes upwardly through said bin, said paddle being of a length substantially equal to the spacing between said side walls at the level of said aperture at the bottom of said bin;

(h) means for rotating one of said pulleys to move said belt in the direction in which said paddle travels upwardly through said bin from said bottom aperture to said top opening;

(i) a bottom flap on said bin sealing said bottom aperture and resiliently deflectable for passage of said paddle upwardly into said bin and returning after passage of said paddle to seal said aperture to prevent bait from falling out, said flap extending between said front, rear and side walls to seal said aperture, said bottom flap being mounted on said rear wall and said flap having a horizontally extending bottom portion and a generally vertically extending mounting portion with its upper end pivotably supported on said rear wall, said flap being pivotable away from said front wall by said paddle; and (j) means for mounting said bin on a boat.

18. The bait dispenser in accordance with claim 17 wherein said bottom flap has an upwardly inclined surface adjacent said belt and said paddle abuts said inclined surface as it moves upwardly from said bottom pulley to deflect said flap.

* * * * *